United States Patent
Trembath

(10) Patent No.: US 11,034,825 B2
(45) Date of Patent: Jun. 15, 2021

(54) FLAME RETARDANT AND THERMALLY STABLE COMPOSITIONS FOR WIRE AND CABLE

(71) Applicant: Therm-O-Link, Inc., Garrettsville, OH (US)

(72) Inventor: Kevin Edward Trembath, Garrettsville, OH (US)

(73) Assignee: THERM-O-LINK, INC., Garrettsville, OH (US)

( * ) Notice: Subject to any disclaimer, the term of this patent is extended or adjusted under 35 U.S.C. 154(b) by 66 days.

(21) Appl. No.: 16/558,713

(22) Filed: Sep. 3, 2019

(65) Prior Publication Data

US 2020/0071511 A1 Mar. 5, 2020

Related U.S. Application Data

(60) Provisional application No. 62/726,536, filed on Sep. 4, 2018.

(51) Int. Cl.

| C08L 23/08 | (2006.01) |
|---|---|
| C08K 3/014 | (2018.01) |
| C08K 3/34 | (2006.01) |
| C08K 3/22 | (2006.01) |
| C08K 3/011 | (2018.01) |
| C08K 5/11 | (2006.01) |
| C08K 5/14 | (2006.01) |
| C08K 5/00 | (2006.01) |
| C08K 9/04 | (2006.01) |
| C08K 5/378 | (2006.01) |

(52) U.S. Cl.
CPC .......... *C08L 23/0853* (2013.01); *C08K 3/011* (2018.01); *C08K 3/014* (2018.01); *C08K 3/2279* (2013.01); *C08K 3/346* (2013.01); *C08K 5/0025* (2013.01); *C08K 5/0066* (2013.01); *C08K 5/11* (2013.01); *C08K 5/14* (2013.01); *C08K 5/378* (2013.01); *C08K 9/04* (2013.01); *C08K 2003/2296* (2013.01); *C08L 2201/02* (2013.01); *C08L 2201/08* (2013.01); *C08L 2312/00* (2013.01)

(58) Field of Classification Search
CPC ............. C08L 23/0853; C08L 2312/00; C08L 2201/02; C08L 2201/08; C08K 3/014; C08K 3/346; C08K 3/2279; C08K 3/011; C08K 5/11; C08K 5/14; C08K 5/0025; C08K 9/04; C08K 5/378; C08K 2003/2296; C08K 5/0066
USPC .......................................................... 524/93
See application file for complete search history.

(56) References Cited

U.S. PATENT DOCUMENTS

| 5,439,965 A * | 8/1995 | Horwatt | C08K 3/2279 524/264 |
| 2013/0161064 A1* | 6/2013 | Shimada | C08L 23/02 174/113 R |

FOREIGN PATENT DOCUMENTS

CN 104974412 * 10/2015

OTHER PUBLICATIONS

Translation of CN 104974412, Oct. 14, 2015. (Year: 2015).*

* cited by examiner

*Primary Examiner* — Hui H Chin
(74) *Attorney, Agent, or Firm* — Fay Sharpe LLP

(57) ABSTRACT

The present disclosure relates to flame retardant and thermally stable crosslinked polyethylene compositions for use in wire or cable applications. The compositions comprise ethylene vinyl acetate copolymer, at least one flame retardant, at least one antioxidant, at least one crosslinking agent, and a heat resistance agent as discussed further herein.

19 Claims, 1 Drawing Sheet

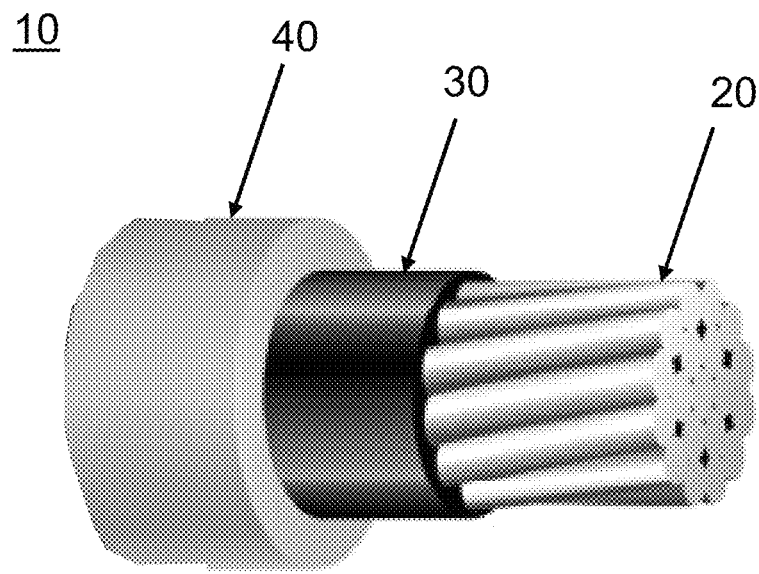

FLAME RETARDANT AND THERMALLY STABLE COMPOSITIONS FOR WIRE AND CABLE

CROSS-REFERENCE TO RELATED APPLICATIONS

This application claims priority to U.S. Provisional Patent Application Ser. No. 62/726,536, filed on Sep. 4, 2018, which is incorporated by reference in its entirety.

BACKGROUND

The present disclosure, in various exemplary embodiments, relates generally to Restriction of Hazardous Substances (i.e., RoHS) compliant compositions with improved flame retardancy and thermal stability.

The RoHS European regulation limits the use of certain hazardous substances in the use or manufacture of various types of electrical equipment. More specifically, RoHS regulations restrict the use of lead, mercury, cadmium, hexavalent chromium, polybrominated biphenyls, polybrominated diphenyl ethers, bis(2-ethylhexyl)phthalate, benzyl butyl phthalate, dibutyl phthalate, and diisobutyl phthalate. Therefore, certain compounds cannot be used in electrical applications in an unrestricted manner without modification or replacement.

BRIEF DESCRIPTION

The present disclosure relates to flame retardant and thermally stable wire and cable compositions. Flame retardancy and thermal stability are desired qualities in wire and cable applications to reduce fire hazards. RoHS compliant crosslinked polyethylene wire or cable compositions are described herein that exhibit flame retardancy and thermal stability.

Disclosed in various embodiments herein are flame retardant and thermally stable polymeric composition, comprising: an ethylene vinyl acetate copolymer, wherein the copolymer comprises from about 8 wt % to about 12 wt % vinyl acetate; at least one flame retardant; at least one antioxidant; at least one crosslinking agent; and at least one heat resistance agent; wherein the composition does not contain a phthalimide-containing flame retardant.

In particular embodiments, the polymeric composition contains: from about 40 wt % to about 60 wt % of the ethylene vinyl acetate copolymer; from about 20 wt % to about 30 wt % of the at least one flame retardant; from about 5 wt % to about 15 wt % of at least one antimony synergist; from about 1 wt % to about 8 wt % of the at least one antioxidant; from about 1 wt % to about 5 wt % of the at least one crosslinking agent; and from about 1 wt % to about 10 wt % of the at least one heat resistance agent.

In more specific embodiments, the copolymer comprises from about 9.3 wt % to about 9.5 wt % vinyl acetate. There is at least one flame retardant, which may comprise ethylene-1,2-bis(pentabromophenyl). The at least one antimony synergist may be antimony trioxide or antimony pentoxide. The at least one antioxidant may comprise zinc 2-mercaptotolumidazole and pentaerythritol tetrakis(3-(3,5-di-tert-butyl-4-hydroxyphenyl)proprionate). The at least one crosslinking agent may comprise a peroxide crosslinking agent. The at least one crosslinking agent may comprise di-(tert-butylperoxyisopropyl)benzene and trimethylolpropane trimethacrylate. There is at least one heat resistance agent, which may comprise zinc oxide.

The polymeric composition can further comprise up to 8 wt % of at least one filler selected from: calcined clay with vinyl silane surface treatment, magnesium hydroxide with vinyl silane surface treatment, or talc.

The polymeric composition can further comprise up to 8 wt % of low density polyethylene. The polymeric composition can further comprise up to 1 wt % of a processing aid. The processing aid may comprise calcium stearate.

The polymeric composition can further comprise up to 5 wt % of an anti-drip agent. The anti-drip agent can be a silicone, such as a silicone fluid or a silicone gum rubber.

Also disclosed in embodiments herein are flame retardant and thermally stable polymeric compositions, comprising: from about 40 wt % to about 60 wt % ethylene vinyl acetate copolymer, wherein the copolymer comprises from about 8 wt % to about 12 wt % vinyl acetate; from about 20 wt % to about 30 wt % ethylene-1,2-bis(pentabromophenyl); from about 5 wt % to about 15 wt % antimony oxide; from about 1 wt % to about 10 wt % zinc oxide; from about 0.5 wt % to about 4 wt % zinc 2-mercaptotolumidazole; from about 0.5 wt % to about 3 wt % di-(tert-butylperoxyisopropyl)benzene; from about 0.1 wt % to about 4 wt % pentaerythritol tetrakis(3-(3,5-di-tert-butyl-4-hydroxyphenyl)proprionate); and from about 0.1 wt % to about 2 wt % trimethylolpropane trimethacrylate.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 1 is an exploded perspective view of an appliance wire having a single conductor core.

DETAILED DESCRIPTION

A more complete understanding of the compositions, processes, polymers, layers, and wires/cables disclosed herein can be obtained by reference to the accompanying drawings. These FIGURES are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

The numerical values in the specification and claims of this application should be understood to include numerical values which are the same when reduced to the same number of significant FIGURES and numerical values which differ from the state value by less than the experimental error of conventional measurement techniques of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

As used herein, approximating language such as "about" may be applied to modify any quantitative representation that may vary without resulting in a change in the basic function to which it is related. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number.

The phrase "up to" is used herein to refer to amounts of a particular ingredient or component. This phrase should be construed to set an upper limit of the recited value, and to require that the particular ingredient or component is present (i.e. in an amount greater than zero). If an ingredient is not required, the term "optional" will be used herein to indicate that the amount of that optional ingredient can be zero, or the amount will be expressly disclosed to include zero. Any description of an ingredient or component being optional should be construed to also disclose embodiments where the ingredient or component is present in an amount greater than zero.

Weight percentage (wt %) is used herein to denote amounts of ingredients of various compositions, and is defined as the mass of a constituent divided by the total mass of all constituents of a mixture.

The compositions of the present disclosure relates generally to compositions which comply with the European Restriction of Hazardous Substances Directive (i.e., RoHS). Specifically, the present disclosure relates to cross-linked polymeric compositions that are flame retardant, thermally stable, and exhibit desired properties. Properties of interest of the various compositions include the tensile strength, elongation percentage, tensile retention after heat aging, elongation retention after heat aging, and VW-1 flame test and oscillating disc rheometer performance. These polymeric compositions are useful for forming layers in wire or cable applications.

The polymeric compositions of the present disclosure comprise a minimum of five components: (A) an ethylene vinyl acetate copolymer, wherein the copolymer comprises from about 8 wt % to about 12 wt % vinyl acetate; (B) at least one flame retardant; (C) at least one antioxidant; (D) at least one crosslinking agent; and (E) at least one heat resistance agent. In addition, the composition does not contain any phthalimide-containing flame retardant. In some particular embodiments, the compositions also comprise (F) an antimony synergist.

The polymeric composition contains the majority ingredient, the ethylene vinyl acetate copolymer (A), in a total amount of from about 40 weight percent (wt %) to about 60 wt %. The ethylene vinyl acetate (EVA) copolymer has a vinyl acetate (VA) content of from about 8 wt % to about 12 wt %, including from about 9.3 wt % to about 9.5 wt % of vinyl acetate. The melt flow index (MFI) of the EVA copolymer is generally from about 2 g/10 min to about 5 g/10 min, including from about 2 g/10 min to about 2.5 g/10 min, as measured according to ASTM D1238. The vinyl acetate groups promote increased crosslinking, which improves tensile strength and heat aging retention. A higher VA content than that disclosed herein is undesired because it results in a composition with a lower tensile modulus. The VA content range disclosed herein is economical and achieves desired properties. Suitable examples of ethylene vinyl acetate copolymers include ELVAX 760 (9.3 wt % VA, MFI=2) and HANWHA 2240 (9.5 wt % VA, MFI=2). A The polymeric composition also includes at least one flame retardant (B), and in particular embodiments a plurality of flame retardants. The polymeric composition does not contain any phthalimide-containing flame retardants. The flame retardant(s) is present in the polymeric composition in a total amount of about 20 wt % to about 50 wt %, including from about 25 wt % to about 45 wt %. Suitable flame retardants include ethylene-1,2-bis(pentabromophenyl) (SAYTEX 8010).

In particular embodiments, the polymeric composition contains a combination of a halogenated flame retardant (B) and an antimony-containing synergist (F). The halogenated flame retardant may be present in the amount of about 20 wt % to about 30 wt % of the polymeric composition. The antimony-containing synergist may be present in the amount of about 5 wt % to about 15 wt % of the polymeric composition. The molar ratio of antimony atoms to halogen atoms in these two ingredients is desirably from 1:2 to 1:4. Examples of such combinations include ethylene-1,2-bis(pentabromophenyl) (SAYTEX 8010), and antimony oxide (Brightsun HB). Specific examples of antimony oxide include antimony trioxide and antimony pentoxide. It is believed that antimony reacts with halogens to form molecules that exist as a dense gas above the flame, smothering the flame. It is noted that although uncoated/untreated magnesium hydroxide and aluminum hydroxide are considered flame retardants, these hydroxides decrease overall flame retardance when combined with halogenated flame retardants and antimony-containing synergists, and the polymeric compositions of the present disclosure should not contain such untreated hydroxides.

Oxidative degradation of the polymeric composition is minimized by the use of at least one antioxidant (C). In particular embodiments, a plurality of antioxidants is used in the polymeric composition. The antioxidant(s) is present in the polymeric composition in a total amount of about 1 wt % to about 8 wt %. Suitable antioxidants include zinc 2-mercaptotolumidazole (VANOX ZMTI) and pentaerythritol tetrakis(3-(3,5-di-tert-butyl-4-hydroxyphenyl)propionate) (IRGANOX 1010). In particular embodiments, the polymeric composition contains zinc 2-mercaptotolumidazole in an amount of about 0.5 wt % to about 4 wt %, and also contains pentaerythritol tetrakis(3-(3,5-di-tert-butyl-4-hydroxyphenyl)propionate) in an amount of about 0.1 wt % to about 4 wt % of the polymeric composition.

Polymer crosslinking is accomplished with peroxide curing by means of at least one crosslinking agent (D). In particular embodiments, a plurality of crosslinking agents is used in the polymeric composition. The crosslinking agent(s) is present in the polymeric composition in a total amount of about 1 wt % to about 5 wt %. The crosslinking agents are typically free radical generators, for example that decompose into peroxide free radicals. In particular embodiments, the at least one crosslinking agent is a peroxide crosslinking agent. Suitable crosslinking agents include di-(tert-butylperoxyisopropyl)benzene (VULCUP R) and trimethylolpropane trimethacrylate (SR-350). In particular embodiments, the polymeric composition contains di-(tert-butylperoxyisopropyl)benzene in an amount of about 0.5 wt % to about 3 wt %, and also contains trimethylolpropane trimethacrylate in an amount of about 0.1 wt % to about 2 wt % of the polymeric composition.

Finally, the polymeric composition also includes at least one heat resistance agent (E). The heat resistance agent may operate, for example, by reflecting infrared light away so that its energy is not absorbed by the polymeric composition or articles made therefrom. More than one heat resistance agent may be used if desired. The heat resistance agent(s) is present in the polymeric composition in an amount of about 1 wt % to about 10 wt %. In particular embodiments, the heat resistance agent is a metal oxide, such as titanium dioxide ($TiO_2$) or zinc oxide (ZnO), typically provided in the form of powder/nanoparticles. Desirably, the heat resistance agent is zinc oxide (for example available as ZOCO 102). Zinc oxide has been observed to reduce char drip and increase cohesive char. This is useful for improving flame resistance through elimination of drip.

The polymeric composition can contain additional polymers as well, if desired. In particular embodiments, low density polyethylene (LDPE) is also present in the polymeric composition. LDPE has a density of 0.917 g/cc to 0.930 g/cc. A low MFI, from about 2 g/10 min to about 3 g/10 min, is desired for the LDPE to achieve desirable composition properties. A suitable LDPE is Westlake Chemical EF606. The combination of the ethylene vinyl acetate copolymer (A) with LDPE with a MFI within the aforementioned ranges aids in achieving desirable physical properties while maintaining manufacturing efficiency. The LDPE, when present, may be used in amounts of up to 8 wt % of the polymeric composition.

Various fillers may also be employed in the polymeric composition. Examples of suitable fillers include calcined clay with vinyl silane surface treatment (e.g. TRANSLINK 37), magnesium hydroxide with vinyl silane surface treatment (e.g. ZEROGEN 50SP), and talc (e.g. MISTRON Vapor R). More than one filler can be used if desired. The filler(s) may be present in a total amount of up to 8 wt % of the polymer composition.

One or more processing aids can be used in the polymeric composition to enhance the efficiency of operating conditions, for example by reducing die buildup, smoothing extrusion conditions, lowering energy consumption, reducing torque or polymer critical shear rate, etc. In particular embodiments, the polymeric composition includes calcium stearate. The processing aid(s) may be present in a total amount of up to 1 wt % of the polymer composition.

One or more anti-drip agents can be used in the polymeric composition. For example, a silicone may be used to improve flame retardance by reducing dripping during ignition. Silicone rubber and silicone fluid have been shown to exhibit the same antagonistic effect on char drip. The silicone rubber may have a Shore A hardness of 30 to 50. The silicone fluid may have a viscosity of 3,000 to 8,000 centiStokes. Silicone fluid is preferable due to its cost-efficiency. The anti-drip agent(s) may be present in a total amount of up to 5 wt % of the polymeric composition.

An adhesion promoter can also be included in the polymeric composition to improve the adhesion of the resulting layer to the copper in the wire/cable. One example of an adhesion promoter is vinyl tris(2-methoxyethyoxy) silane. The adhesion promoter(s) can be present in a total amount of up to 5 wt % of the polymeric composition.

It is specifically contemplated that the additional polymer(s), filler(s), processing aid(s), anti-drip agent(s), and adhesion promoter(s) can be included in the polymeric compositions of the present disclosure in any combination of these additives (i.e. any 1, 2, 3, 4, or all 5 of these additives can be present).

In some specific embodiments, the polymeric composition contains: from about 40 wt % to about 60 wt % of the ethylene vinyl acetate copolymer; from about 20 wt % to about 50 wt % of the at least one flame retardant; from about 1 wt % to about 8 wt % of the at least one antioxidant; from about 1 wt % to about 5 wt % of the at least one crosslinking agent; and from about 1 wt % to about 10 wt % of the at least one heat resistance agent.

In more specific embodiments, the polymeric composition comprises from about 40 wt % to about 60 wt % ethylene vinyl acetate copolymer, wherein the copolymer comprises from about 8 wt % to about 12 wt % vinyl acetate; from about 20 wt % to about 30 wt % ethylene-1,2-bis(pentabromophenyl); from about 5 wt % to about 15 wt % antimony oxide; from about 1 wt % to about 10 wt % zinc oxide; from about 0.5 wt % to about 4 wt % zinc 2-mercaptotolumidazole; from about 0.5 wt % to about 3 wt % di-(tert-butylperoxyisopropyl)benzene; from about 0.1 wt % to about 4 wt % pentaerythritol tetrakis(3-(3,5-di-tert-butyl-4-hydroxyphenyl)proprionate); and from about 0.1 wt % to about 2 wt % trimethylolpropane trimethacrylate. These polymeric compositions can also include up to 4 wt % of calcined clay with vinyl silane surface treatment; up to 5.5 wt % of magnesium hydroxide with vinyl silane surface treatment; up to 6.25 wt % talc; up to 5.5 wt % LDPE; up to 0.5 wt % calcium stearate; up to 2.5 wt % silicone fluid; or up to 2.8 wt % silicone rubber, in any combination.

In even more specific embodiments, the polymeric composition comprises from about 50 wt % to about 57 wt % ethylene vinyl acetate copolymer, wherein the copolymer comprises from about 9.3 wt % to about 9.5 wt % vinyl acetate; from about 22 wt % to about 28 wt % ethylene-1,2-bis(pentabromophenyl); from about 8 wt % to about 10 wt % antimony oxide; from about 2.75 wt % to about 5 wt % zinc oxide; from about 1.9 wt % to about 2.9 wt % zinc 2-mercaptotolumidazole; from about 1.3 wt % to about 1.7 wt % di-(tert-butylperoxyisopropyl)benzene; from about 0.8 wt % to about 2.8 wt % pentaerythritol tetrakis(3-(3,5-di-tert-butyl-4-hydroxyphenyl)proprionate); and from about 0.5 wt % to about 0.6 wt % trimethylolpropane trimethacrylate. These polymeric compositions can also include up to 4 wt % of calcined clay with vinyl silane surface treatment; up to 5.5 wt % of magnesium hydroxide with vinyl silane surface treatment; up to 6.25 wt % talc; up to 5.5 wt % LDPE; up to 0.5 wt % calcium stearate; up to 2.5 wt % silicone fluid; or up to 2.8 wt % silicone rubber, in any combination.

The polymeric compositions of the present disclosure can be used to form insulating layers in a wire or cable. The polymeric compositions are extruded using methods known in the art. FIG. 1 is a perspective view of an appliance wire 10 contemplated by the present disclosure. The appliance wire 10 includes a conductor 20 which is made up of a plurality of electrically conductive wires (e.g. made of copper). The electrically conductive wires can be straight or be helically wound. Put another way, the conductor can be concentric stranded, bunch stranded, rope stranded, a sector conductor, a segmental conductor, an annular conductor, a compact stranded conductor, or a compressed conductor. In some cases, if desired, a tin coating 30 surrounds the conductor 20. This optional coating can be applied by electroplating or by dipping. An electrically insulating layer 40 then surrounds the conductor 20 and the tin coating 30. The electrically insulating layer usually has a thickness of about 30 mils to about 45 mils (1 mil=1/1000 of an inch). A lubricating agent can alternatively be sprayed onto the conductor to reduce adhesion between the conductor and the insulating layer. Desirably, the adhesion force of the insulation is about 5 lbf to about 20 lbf. The polymeric compositions of the present disclosure can be used to form the electrically insulating layer 40.

The following examples are for purposes of further illustrating the present disclosure. The examples are merely illustrative and are not intended to limit the disclosure to the methods, materials, conditions, or process parameters set forth therein.

EXAMPLES

11 Examples were made and subjected to a battery of tests. Those tests included UL VW-1 flame test; tensile strength; elongation %; tensile retention after heat aging; elongation retention after heat aging; and measuring minutes until a two point rise on an oscillating disc rheometer.

A UL VW-1 flame test on 20 AWG wires was performed. Briefly, a wire is suspended vertically. The wire is 24 inches long. A paper flag is positioned 10 inches above the point at which the flame is applied to the wire. A cotton base is positioned below the wire. The flame source is a burner (similar to a Bunsen burner) with a heat output of about 1706 BTU/hour (500 W). The burner is mounted at a 20° angle, and the flame is applied for 15 seconds to the wire. The flame is reapplied at least 4 times (i.e. a total of 5 times minimum), each time the wire stops burning. The wire fails the test if the wire burns longer than 60 seconds after any application of flame, or if more than 25% of the paper flag is burned away, or if the cotton base is ignited by dripping material.

For the present disclosure, success on the VW-1 flame test was based on the number of passing results per six tests, with a score of five required for a passing result.

Tensile strength was measured according to UL 2556. For the present disclosure, a successful composition required the tensile strength to exceed 2000 psi for a passing result.

Elongation percentage was measured according to UL 2556. For the present disclosure, a successful composition required the elongation percentage to exceed 300% for a passing result.

Tensile retention after heat aging was measured according to UL 2556. For the present disclosure, a successful composition required the tensile retention after heat aging to exceed 80% for a passing result.

Elongation retention after heat aging was measured according to UL 2556. For the present disclosure, a successful composition required the elongation retention after heat aging to exceed 80% for a passing result.

Additionally, cure parameters were assessed by measuring minutes until a two point rise on an oscillating disc rheometer. This was performed according to ASTM D2084.

One Comparative Example and 11 Examples were made and tested. The ingredients in each composition are listed in Tables 1A/1B. The test results are listed in Table 2.

TABLE 1A

| Ingredient | Comp. Ex. 1 | Ex. 1 | Ex. 2 | Ex. 3 | Ex. 4 | Ex. 5 |
|---|---|---|---|---|---|---|
| EVA (9.3% VA, 2 MI) | | 50.00 | 50.00 | 50.00 | 50.00 | 50.00 |
| EVA (9.5% VA, 2 MI) | | | | | | |
| EVA (9.0% VA, 2.2 MI) | 55.87 | | | | | |
| LDPE (2.2 MFI) | | | | | | |
| Ethylene-bistetrabromo pthalimide | 16.76 | | | | | |
| Ethylene-1,2-bis(pentabromophenyl) | | 27.00 | 28.00 | 28.00 | 22.00 | 22.00 |
| Antimony Oxide | 8.38 | 9.00 | 10.00 | 10.00 | 8.00 | 8.00 |
| Calcined Clay with Vinyl Silane Surface Treatment | | 2.00 | | | | |
| Zinc Oxide | 5.59 | 3.25 | 3.25 | | 5.00 | |
| Magnesium Hydroxide | | | | 3.25 | | 11.25 |
| Talc | | | | | 6.25 | |
| Zinc 2-Mercaptotolumidazole | 5.59 | 2.50 | 2.50 | 2.50 | 2.50 | 2.50 |
| Pentaerythritol tetrakis(3-(3,5-di-tert-butyl-4-hydroxyphenyl) propionate) | 2.79 | 1.25 | 1.25 | 1.25 | 1.25 | 1.25 |
| Silicone Rubber | 2.79 | | | | | |
| Silicone Fluid | | 2.50 | 2.50 | 2.50 | 2.50 | 2.50 |
| Calcium Stearate | | 0.50 | 0.50 | 0.50 | 0.50 | 0.50 |
| Trimethylolpropane Trimethacrylate | 0.56 | 0.50 | 0.50 | 0.50 | 0.50 | 0.50 |
| di-(tert-butylperoxyisopropyl) benzene | 1.68 | 1.50 | 1.50 | 1.50 | 1.50 | 1.50 |

TABLE 1B

| Ingredient | Ex. 6 | Ex. 7 | Ex. 8 | Ex. 9 | Ex. 10 | Ex. 11 |
|---|---|---|---|---|---|---|
| EVA (9.3% VA, 2 MI) | 50.00 | 50.00 | | 25.00 | 56.98 | 49.45 |
| EVA (9.5% VA, 2 MI) | | | 50.00 | 25.00 | | |
| EVA (9.0% VA, 2.2 MI) | | | | | | |
| LDPE (2.2 MFI) | | | | | | 5.49 |
| Ethylene-bistetrabromo pthalimide | | | | | | |
| Ethylene-1,2-bis(pentabromophenyl) | 25.50 | 25.50 | 27.00 | 27.00 | 22.79 | 21.98 |
| Antimony Oxide | 8.50 | 8.50 | 9.00 | 9.00 | 8.55 | 8.24 |
| Calcined Clay with Vinyl Silane Surface Treatment | 2.25 | 4.00 | 2.00 | 2.00 | | |

TABLE 1B-continued

| Ingredient | Ex. 6 | Ex. 7 | Ex. 8 | Ex. 9 | Ex. 10 | Ex. 11 |
|---|---|---|---|---|---|---|
| Zinc Oxide | 5.00 | 3.25 | 3.25 | 3.25 | 2.85 | 2.75 |
| Magnesium Hydroxide | | | | | | 5.49 |
| Talc | | | | | | |
| Zinc 2-Mercaptotolumidazole | 2.50 | 2.50 | 2.50 | 2.50 | 2.85 | 1.92 |
| Pentaerythritol tetrakis(3-(3,5-di-tert-butyl-4-hydroxyphenyl) propionate) | 1.25 | 1.25 | 1.25 | 1.25 | 1.71 | 0.82 |
| Silicone Rubber | | | | | | 1.65 |
| Silicone Fluid | 2.50 | 2.50 | 2.50 | 2.50 | 1.71 | |
| Calcium Stearate | 0.50 | 0.50 | 0.50 | 0.50 | 0.28 | 0.27 |
| Trimethylolpropane Trimethacrylate | 0.50 | 0.50 | 0.50 | 0.50 | 0.57 | 0.55 |
| di-(tert-butylperoxyisopropyl) benzene | 1.50 | 1.50 | 1.50 | 1.50 | 1.71 | 1.37 |

TABLE 2

| Example | VW-1 Flame Test (# passing results) | Tensile Strength (psi) | Elongation Percentage (%) | Tensile Retention After Heat Aging (%) | Elongation Retention After Heat Aging (%) | Oscillating Disc Rheometer (min.) |
|---|---|---|---|---|---|---|
| Comp. Ex. 1 | 3.0 | 3230 | 460 | 86 | 86 | 1.75 |
| Ex. 1 | 6.0 | 2640 | 428 | 100 | 87 | 1.29 |
| Ex. 2 | 5.5 | 2815 | 386 | 112 | 105 | 1.52 |
| Ex. 3 | 0 | 2651 | 402 | 113 | 103 | 1.43 |
| Ex. 4 | 5.0 | 2947 | 392 | 99 | 102 | 1.35 |
| Ex. 5 | 0 | 2483 | 396 | 116 | 105 | 1.44 |
| Ex. 6 | 5.5 | 2847 | 373 | 105 | 96 | 0.76 |
| Ex. 7 | 5.0 | 2969 | 377 | 106 | 93 | 0.80 |
| Ex. 8 | 6.0 | 2880 | 431 | 98 | 96 | 1.26 |
| Ex. 9 | 6.0 | 2890 | 454 | 98 | 99 | 1.29 |
| Ex. 10 | 5.5 | 2879 | 412 | 101 | 87 | 1.25 |
| Ex. 11 | 5.0 | 2709 | 412 | 93 | 91 | 1.24 |

In reviewing the results, Examples 3 and 5 failed the flame test. It is believed that this was due to the presence of the magnesium hydroxide and potentially the lack of zinc oxide. Example 11 also contained magnesium hydroxide, but also contained zinc oxide and silicone rubber as an anti-drip agent. It is possible the presence of these two ingredients in Example 11 successfully countered the use of the magnesium hydroxide. Examples 1, 8, and 9 performed best. Examples 2 and 10 also had good performance properties, while Examples 4, 7, and 11 were acceptable.

The Comparative Example failed the UL VW-1 flame test. Although it had the highest tensile strength, it had the lowest tensile retention after heat aging, the lowest elongation retention after heat aging, and the longest cure time (as measured by time on the oscillating disc rheometer).

The present disclosure has been described with reference to exemplary embodiments. Modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A flame retardant polymeric composition, comprising:
    from about 40 wt % to about 60 wt % of an ethylene vinyl acetate copolymer, wherein the copolymer comprises from about 8 wt % to about 12 wt % vinyl acetate;
    from about 20 wt % to about 30 wt % of at least one flame retardant, wherein the at least one flame retardant comprises ethylene-1,2-bis(pentabromophenyl);
    from about 5 wt % to about 15 wt % of at least one antimony-containing synergist;
    from about 1 wt % to about 8 wt % of at least one antioxidant;
    from about 1 wt % to about 5 wt % of at least one crosslinking agent; and
    from about 1 wt % to about 10 wt % of at least one heat resistance agent;
    wherein the composition does not contain a phthalimide-containing flame retardant.

2. The polymeric composition of claim 1, wherein the copolymer comprises from about 9.3 percent to about 9.5 percent vinyl acetate.

3. The polymeric composition of claim 1, wherein the antimony-containing synergist comprises an antimony oxide.

4. The polymeric composition of any claim 1, wherein the at least one antioxidant comprises zinc 2-mercaptotolumidazole and pentaerythritol tetrakis(3-(3,5-di-tert-butyl-4-hydroxyphenyl)proprionate).

5. The polymeric composition of claim 1, wherein the at least one crosslinking agent comprises a peroxide crosslinking agent.

6. The polymeric composition of claim 1, wherein the at least one crosslinking agent comprises di-(tert-butylperoxyisopropyl)benzene and trimethylolpropane trimethacrylate.

7. The polymeric composition of claim 1, wherein the at least one heat resistance agent comprises zinc oxide.

8. The polymeric composition of claim 1, further comprising up to 8 wt % of at least one filler selected from: calcined clay with vinyl silane surface treatment, magnesium hydroxide with vinyl silane surface treatment, or talc.

9. The polymeric composition of claim 1, further comprising up to 8 wt % of low density polyethylene.

10. The polymeric composition of claim 1, further comprising up to 1 wt % of a processing aid.

11. The polymeric composition of claim 10, wherein the processing aid comprises calcium stearate.

12. The polymeric composition of claim 1, further comprising up to 5 wt % of an anti-drip agent.

13. The polymeric composition of claim 12, wherein the anti-drip agent is a silicone anti-drip agent.

14. The polymeric composition of claim 1, further comprising up to 5 wt % of an adhesion promoter.

15. The polymeric composition of claim 1, wherein the adhesion promoter is vinyl tris(2-methoxyethoxy) silane.

16. A flame retardant polymeric composition, comprising:
    from about 40 wt % to about 60 wt % of an ethylene vinyl acetate copolymer, wherein the copolymer comprises from about 8 wt % to about 12 wt % vinyl acetate;
    from about 20 wt % to about 30 wt % ethylene-1,2-bis (pentabromophenyl);
    from about 5 wt % to about 15 wt % antimony oxide;
    from about 1 wt % to about 10 wt % zinc oxide;

from about 0.5 wt % to about 4 wt % zinc 2-mercapto-tolumidazole;

from about 0.5 wt % to about 3 wt % di-(tert-butylperoxyisopropyl)benzene;

from about 0.1 wt % to about 4 wt % pentaerythritol tetrakis(3-(3,5-di-tert-butyl-4-hydroxyphenyl)propionate); and from about 0.1 wt % to about 2 wt % trimethylolpropane trimethacrylate.

17. The polymeric composition of claim 16, further comprising up to 4 wt % of calcined clay with vinyl silane surface treatment; up to 5.5 wt % of magnesium hydroxide with vinyl silane surface treatment; up to 6.25 wt % talc; up to 5.5 wt % LDPE; up to 0.5 wt % calcium stearate; up to 2.5 wt % silicone fluid; or up to 2.8 wt % silicone rubber.

18. A wire or cable comprising a layer made from the polymer composition of claim 1.

19. The polymeric composition of claim 13, wherein the silicone anti-drip agent is a silicone fluid or a silicone gum rubber.

\* \* \* \* \*